United States Patent
Schmitt (10) Patent No.: US 9,221,445 B2
(45) Date of Patent: Dec. 29, 2015

(54) METHOD FOR OPERATING AN ELECTRONICALLY CONTROLLABLE BRAKE SYSTEM

(71) Applicant: Lucas Automotive GmbH, Koblenz (DE)

(72) Inventor: Hubert Schmitt, Ochtendung (DE)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 14/399,652

(22) PCT Filed: May 2, 2013

(86) PCT No.: PCT/EP2013/059115
§ 371 (c)(1),
(2) Date: Nov. 7, 2014

(87) PCT Pub. No.: WO2013/167457
PCT Pub. Date: Nov. 14, 2013

(65) Prior Publication Data
US 2015/0088396 A1   Mar. 26, 2015

(30) Foreign Application Priority Data
May 10, 2012   (DE) .......................... 10 2012 009 360

(51) Int. Cl.
*B60T 8/17* (2006.01)
*B60T 8/172* (2006.01)
*B60T 15/02* (2006.01)
*B60T 8/44* (2006.01)
*B60T 13/74* (2006.01)
*B60T 8/1755* (2006.01)

(52) U.S. Cl.
CPC .............. *B60T 8/447* (2013.01); *B60T 8/1755* (2013.01); *B60T 13/745* (2013.01)

(58) Field of Classification Search
CPC ...... B60T 8/447; B60T 8/1755; B60T 13/745
USPC ........................................................... 701/70
See application file for complete search history.

(56) References Cited

U.S. PATENT DOCUMENTS 5,234,261 A * 8/1993 Leyes et al. .................. 303/158
2012/0013173 A1   1/2012 Leiber et al.
(Continued)

FOREIGN PATENT DOCUMENTS

DE   10 2010 008 033 A1   8/2011
WO   2010/091883 A1   8/2010
(Continued)

OTHER PUBLICATIONS

PCT International Search Report and Written Opinion, Application No. PCT/EP2013/059115 dated Oct. 23, 2013.

*Primary Examiner* — Mary Cheung
*Assistant Examiner* — Anne Mazzara
(74) *Attorney, Agent, or Firm* — MacMillan, Sobanski & Todd, LLC (57) ABSTRACT

An electronically controllable braking system includes a hydraulic brake-pressure generator which generates the brake pressures for the wheel brakes. In the hydraulic connection to the brake-pressure generator, a valve arrangement has been assigned to each wheel brake in order to adjust the brake pressures demanded for the wheel brakes in the multiplex mode, for the purpose of operating the braking system. A method has the following steps: establishing for which of the wheel brakes the adjusting of the brake pressure demanded for it has priority in a current multiplex cycle; generating the brake pressure demanded for the wheel brake that has been set to priority; opening the valve arrangement that has been assigned to the wheel brake that has been set to priority; and closing the valve arrangements that have been assigned to the wheel brakes that have not been set to priority.

10 Claims, 4 Drawing Sheets

(56) References Cited

U.S. PATENT DOCUMENTS

2012/0306261 A1   12/2012  Leiber et al.
2013/0127237 A1    5/2013  Pfeiffer et al.

FOREIGN PATENT DOCUMENTS

WO    2011/098573 A1   8/2011
WO    2011/104056 A1   9/2011

\* cited by examiner

METHOD FOR OPERATING AN ELECTRONICALLY CONTROLLABLE BRAKE SYSTEM

CROSS-REFERENCE TO RELATED APPLICATIONS

This application is the National Phase of International Application PCT/EP2013/059115 filed May 2, 2013, which designated the U.S. That International Application was published in English under PCT Article 21(2) on Nov. 14, 2013 as International Publication Number WO 2013/167457A1. PCT/EP2013/059115 claims priority to German Application No. 10 2012 009 360.8 filed May 10, 2012. Thus, the subject nonprovisional application also claims priority to German Application No. 10 2012 009 360.8 filed May 10, 2012 The disclosures of both applications are incorporated herein by reference.

BACKGROUND OF THE INVENTION

The invention relates to a method for operating an electronically controllable braking system for a motor vehicle, which includes a hydraulic brake-pressure generator which generates the brake pressures for the wheel brakes of the vehicle, wherein in the hydraulic connection to the brake-pressure generator a valve arrangement has been assigned to each wheel brake in order to adjust the brake pressures demanded for the wheel brakes in multiplex mode.

A braking system of such a type is known from, inter alia, WO 2010/091883 A1. This braking system exhibits a piston/cylinder system driven by an electric motor, which via hydraulic lines is connected to at least two wheel brakes, whereby in each instance a 2/2-way valve has been assigned to a wheel brake and the hydraulic connecting lines between the wheel brakes and the piston/cylinder system are capable of being closed, optionally separately or jointly, by means of the 2/2-way valves, so that a pressure is capable of being regulated in the wheel brakes in succession in multiplex mode. In this braking system the flow resistances have been dimensioned in such a way that the piston speed of the piston/cylinder system determines the pressure-reduction gradient and pressure-buildup gradient in each wheel brake, so that during the reduction of pressure and build-up of pressure the piston speed is regulated or controlled in a manner depending on the pressure/volume characteristic of the wheel brakes. With the aid of an additional pressure model, the pressure in the wheel brakes is constantly included in the calculation. As soon as the target pressure for a wheel brake has been attained, the respective 2/2-way valve is closed. The piston of the piston/cylinder system then moves on, in order to operate the remaining wheel brakes. In the last wheel brake to be operated the pressure control is undertaken via the piston travel, which was calculated previously from the pressure/volume characteristic. After this, the 2/2-way valve of the last wheel brake can be closed.

Since in the case of the braking system known from WO 2010/091883 A1 the reduction of pressure and the build-up of pressure are regulated or controlled in a manner depending on the pressure/volume characteristic of the wheel brakes, there is, in fact, the advantage of being able to calculate the pressure in the wheel brakes with the aid of a pressure model, so that a saving can be made on corresponding pressure sensors. However, there is the disadvantage that, by reason of the dependence on the piston travel or the piston speed of the piston/cylinder system, priority cannot always be given to the build-up of pressure or reduction of pressure at a particular wheel brake. This can impair the control quality in the case of an anti-lock braking system (ABS) or electronic stability program (ESP), and may consequently have a critical effect on the braking distance and the stability of the vehicle.

SUMMARY OF THE INVENTION

It is an object of the invention to counteract this disadvantage, in order to improve the efficiency of the braking system.

With a view to achieving this object, for the purpose of operating a braking system of the type described in the introduction the invention proposes a method having the following steps: (a.) establishing for which of the wheel brakes the adjusting of the brake pressure demanded for it in a current multiplex cycle has priority; (b. generating the brake pressure demanded for the wheel brake that has been set to priority; (c.) opening the valve arrangement that has been assigned to the wheel brake that has been set to priority; (d.) closing the valve arrangements that have been assigned to the wheel brakes that have not been set to priority.

Accordingly, if the adjusting of the brake pressure for a wheel brake in a multiplex cycle has been set to priority, the brake pressure demanded for the wheel brake that has been set to priority is adjusted by the brake-pressure generator, and only the valve arrangement assigned to the wheel brake that has been set to priority is opened, whereas all the other valve arrangements—assigned to the wheel brakes that have not been set to priority—are or remain closed. Consequently it is ensured that in a multiplex cycle the brake pressure in the wheel brake that has been set to priority is always adjusted first.

The control-engineering advantage thereby attained becomes particularly clear when one considers the consequences that may arise in the case of the braking system known from WO 2010/091883 A1 if the brake pressure in the wheel brake actually to be set to priority in a multiplex cycle is adjusted not as the first but as one of the last. For, at any rate, the cycle-time of a multiplex cycle has an order of magnitude of 10 ms (in words: 10 milliseconds), so that delay-times of this order of magnitude may occur in the event of non-compliance with the priority when adjusting the brake-pressure.

In preferred manner, in the case of a build-up of brake pressure the following step has been provided: (e.) opening the valve arrangement that has been assigned to a wheel brake that has not been set to priority if the brake pressure demanded for the assigned wheel brake is greater than the generated brake pressure. Consequently, also in at least one other wheel brake—not set to priority—a faster build-up of brake pressure can be achieved if for said wheel brake a greater brake pressure than for the wheel brake that has been set to priority has been demanded, since the valve arrangement assigned to said wheel brake is opened synchronously with step (c.).

Undesirable pressure discontinuities in the course of step (e.) can be prevented by the following step: (f.) opening the valve arrangement that has been assigned to a wheel brake that has not been set to priority if the brake pressure at the assigned wheel brake held over from the preceding multiplex cycle is less than the generated brake pressure. Consequently, a build-up of brake pressure in at least one other wheel brake—not set to priority—is permitted only when the brake pressure at said wheel brake still held over from the preceding multiplex cycle is less than the brake pressure demanded for the wheel brake that has been set to priority.

In preferred manner, in the case of a reduction of brake pressure the following step has been provided: (g.) opening the valve arrangement that has been assigned to a wheel brake that has not been set to priority if the brake pressure demanded for the assigned wheel brake is less than the generated brake pressure. Consequently, also in at least one other wheel brake—not set to priority—a faster reduction of brake pressure can be achieved if for said wheel brake a lower brake pressure than for the wheel brake that has been set to priority has been demanded, since the valve arrangement assigned to said wheel brake is opened synchronously with step (c.).

Undesirable pressure discontinuities in the course of step (g.) can be prevented by the following step: (h.) opening the valve arrangement that has been assigned to a wheel brake that has not been set to priority if the brake pressure at the assigned wheel brake held over from the preceding multiplex cycle is greater than the generated brake pressure. Consequently a reduction of brake pressure in at least one other wheel brake—not set to priority—is permitted only when the brake pressure at said wheel brake still held over from the preceding multiplex cycle is greater than the brake pressure demanded for the wheel brake that has been set to priority.

The decision relating to step (a.)—for which of the wheel brakes the adjusting of the brake pressure demanded for it in a current multiplex cycle is to be set to priority—is made in accordance with braking-dynamics and drive-dynamics criteria. If, for example, it is a question of shortening the braking distance of the vehicle, a build-up of brake pressure at the wheel brakes of the front wheels may have priority over a reduction of brake pressure; but if, for example, it is a question of enhancing the stability of the vehicle, a reduction of brake pressure at the wheel brakes of the rear wheels may have priority over a build-up of brake pressure. To this end, the following step may be provided: (i.) transferring or allocating the priority for the adjusting of the demanded brake pressure in the current multiplex cycle to a wheel brake that has not yet been set to priority in the current multiplex cycle. Consequently it is possible within a multiplex cycle to allocate a number of priorities corresponding to the number of wheel brakes—that is to say, four priorities in the case of four wheel brakes—this being particularly important if within a multiplex cycle both build-ups of brake pressure and reductions of brake pressure are to be adjusted.

By way of further steps, the following have been provided: (k.) closing the valve arrangement if the demanded brake pressure in the assigned wheel brake has been attained; and (l.) keeping the valve arrangement closed until the end of the current multiplex cycle or until the start of the following multiplex cycle.

The invention also relates to an electronically controllable braking system for a motor vehicle, including a hydraulic brake-pressure generator which generates the brake pressures demanded for the wheel brakes of the vehicle, whereby in the hydraulic connection to the brake-pressure generator a valve arrangement has been assigned to each wheel brake. In order to improve the efficiency of the braking system, for the electric drive of the brake-pressure generator and of the valve arrangements an electronic control unit has been provided, by means of which the braking system is operated in accordance with the method according to the invention.

In this connection, in advantageous manner the invention provides that the brake pressure generated by the brake-pressure generator is registered by means of a sensor device and is compared in the electronic control unit with the brake pressures demanded for the wheel brakes, in order to regulate or control the brake pressure generated by the brake-pressure generator.

BRIEF DESCRIPTION OF THE DRAWINGS

The invention will be elucidated in more detail in the following on the basis of the drawings. With reference thereto.

DETAILED DESCRIPTION OF THE PREFERRED EMBODIMENT

Figure 1:
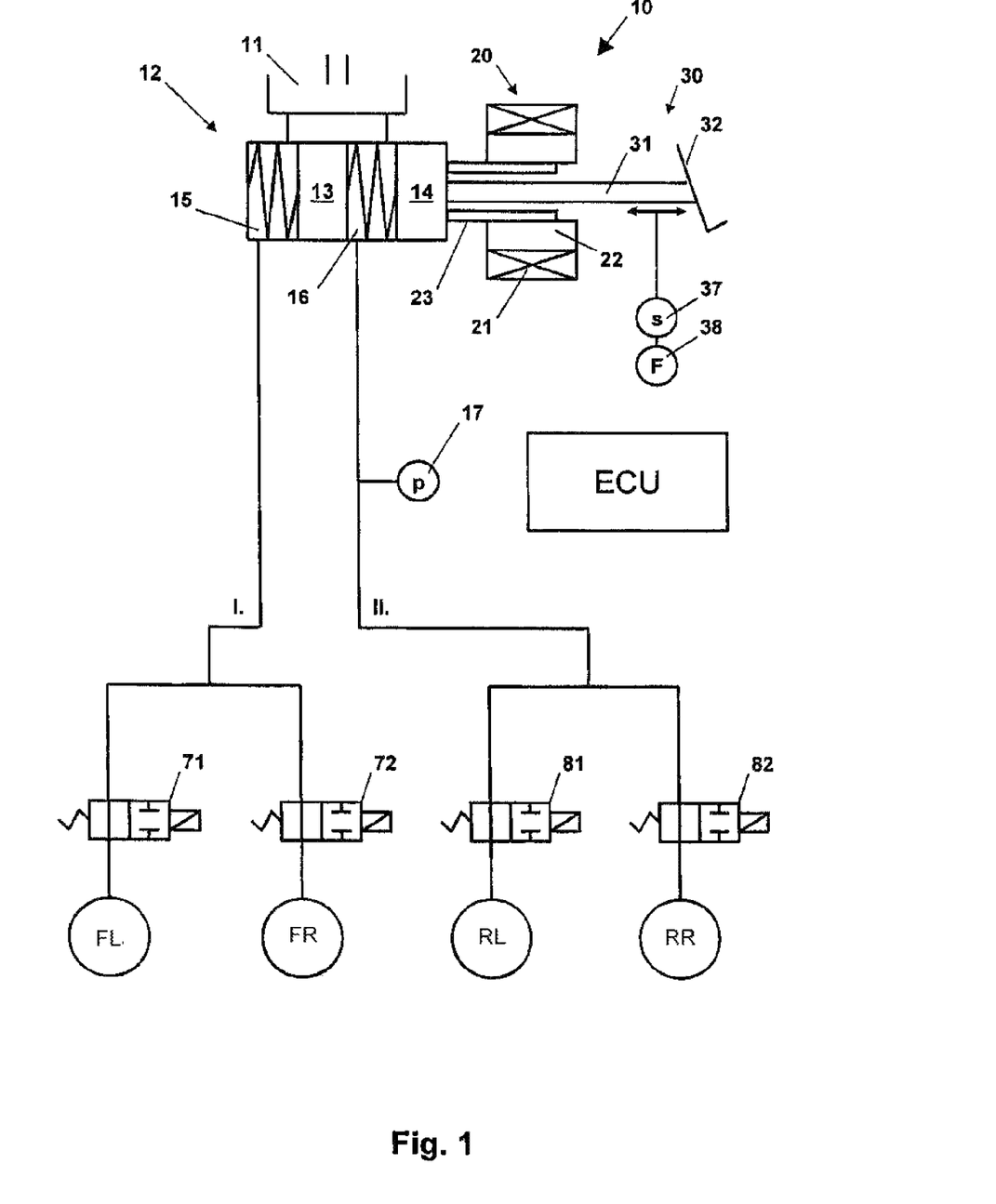
FIG. 1 shows an embodiment of an electronically controllable braking system that can be operated by the method according to the invention.

The electronically controllable braking system represented in FIG. 1 includes a hydraulic brake-pressure generator 10 which operates by means of a hydraulic fluid which has been stored, in part, in an unpressurised tank 11. The tank 11 has been connected to a brake master cylinder 12 in which the generating of brake pressures by pressurising the hydraulic fluid takes place. To this end, in the brake master cylinder 10 two movable pistons 13 and 14 in the form of a tandem arrangement have been received, which delimit two separate hydraulic chambers 15 and 16, at the outputs of which two brake circuits I and II are supplied, each brake circuit acting on two wheel brakes FL (front left), FR (front right) and RL (rear left), RR (rear right). Depending on which wheel brake of the vehicle is actuated via which brake circuit, a front/rear-axle partitioning results, which means the one brake circuit actuates the wheel brakes of the front axle, and the other those of the rear axle, or a diagonal partitioning results, which means each brake circuit actuates the wheel brake of a front wheel and that of the diagonally opposite rear wheel.

An actuating of the brake master cylinder 12 may be effected by means of an electromechanical servomechanism 20 and/or a mechanical servomechanism 30, jointly or independently of one another. To this end, both the electromechanical servomechanism 20 and the mechanical servomechanism 30 act on the input side on the end face of piston 14 opposite the hydraulic chamber 16, in order to set the pistons 13 and 14 in longitudinal motion (by reason of their tandem arrangement).

The electromechanical servomechanism 20 includes an electric motor 21 which via a transmission 22, 23 acts on piston 14 on the input side. The electric motor 21 and the transmission 22, 23 have been arranged concentrically with respect to one another, the transmission 22, 23 taking the form of a nut/spindle arrangement which preferably exhibits a recirculating ball. The nut 22 of the transmission has been supported so as to be rotatable, and the spindle 23 of the transmission acting on piston 14 has been supported so as to be secured against rotation, in order to convert rotary motions of the electric motor 21 into linear motions of the spindle 23 and consequently of the pistons 13 and 14.

The mechanical servomechanism 30 exhibits an actuating member 31 which has been arranged concentrically with respect to the electric motor 21 and the transmission 22, 23 so as to be displaceable in the longitudinal direction. The actuating member 31, which has been coupled in articulated manner with a brake pedal 32, is capable of acting like the spindle 23 on piston 14 on the input side, in order to set the pistons 13 and 14 in longitudinal motion.

By means of a coupling and decoupling device (not represented) it is possible to switch whether an actuating of the brake master cylinder 12 is effected by means of the electromechanical servomechanism 20 and/or by means of the mechanical servomechanism 30. If the mechanical servomechanism 30 has been fully decoupled, the brake master cylinder 12 is actuated for "brake by wire" operation exclusively by means of the electromechanical servomechanism 20. To this end, by means of a simulation device (not represented) a pedal response is made available upon actuation of the brake pedal 32, in order to register, by means of sensor devices 37 and 38, the actuation distances induced by the driver on the brake pedal 32, and the associated actuating force F.

In an electronic control unit ECU the registered actuation distance s and the associated actuating force F are evaluated, in order to determine the brake-pressure demand of the driver. Depending on the brake-pressure demand, the electronic control unit ECU undertakes the electric drive of the electric motor 21 of the electromechanical servomechanism 20. The brake pressure p generated upon actuating the brake master cylinder 12 is registered by means of a sensor device 17 and is cyclically compared in the electronic control unit ECU with the brake-pressure demand, in order to regulate or control the brake pressure p. Since, by reason of the tandem arrangement of the pistons 13 and 14 of the brake master cylinder 12, a brake pressure p is generated that is (substantially) matching for both brake circuits I and II, for the purpose of registering the brake pressure p only one sensor device 17 is required, which here registers the brake pressure p generated in brake circuit II.

Should a defect occur in the electromechanical servomechanism 20, for example a fault in the electric drive of the electric motor 21, by means of the coupling and decoupling device a direct actuating of the brake master cylinder 12, depending on an actuation of the brake pedal 32, becomes possible in order to guarantee an emergency braking mode.

In the hydraulic connection to the brake master cylinder 12 and brake-pressure generator 10 a valve arrangement 71, 72, 81 and 82 has been respectively assigned to each of the wheel brakes FL, FR, RL and RR. The valve arrangements 71, 72, 81 and 82 have each been configured as electromagnetically actuated 2/2-way valves which in the unactuated state as represented are open. The electric drive of the valve arrangements 71, 72, 81 and 82 is effected by the electronic control unit ECU.

Figure 2:
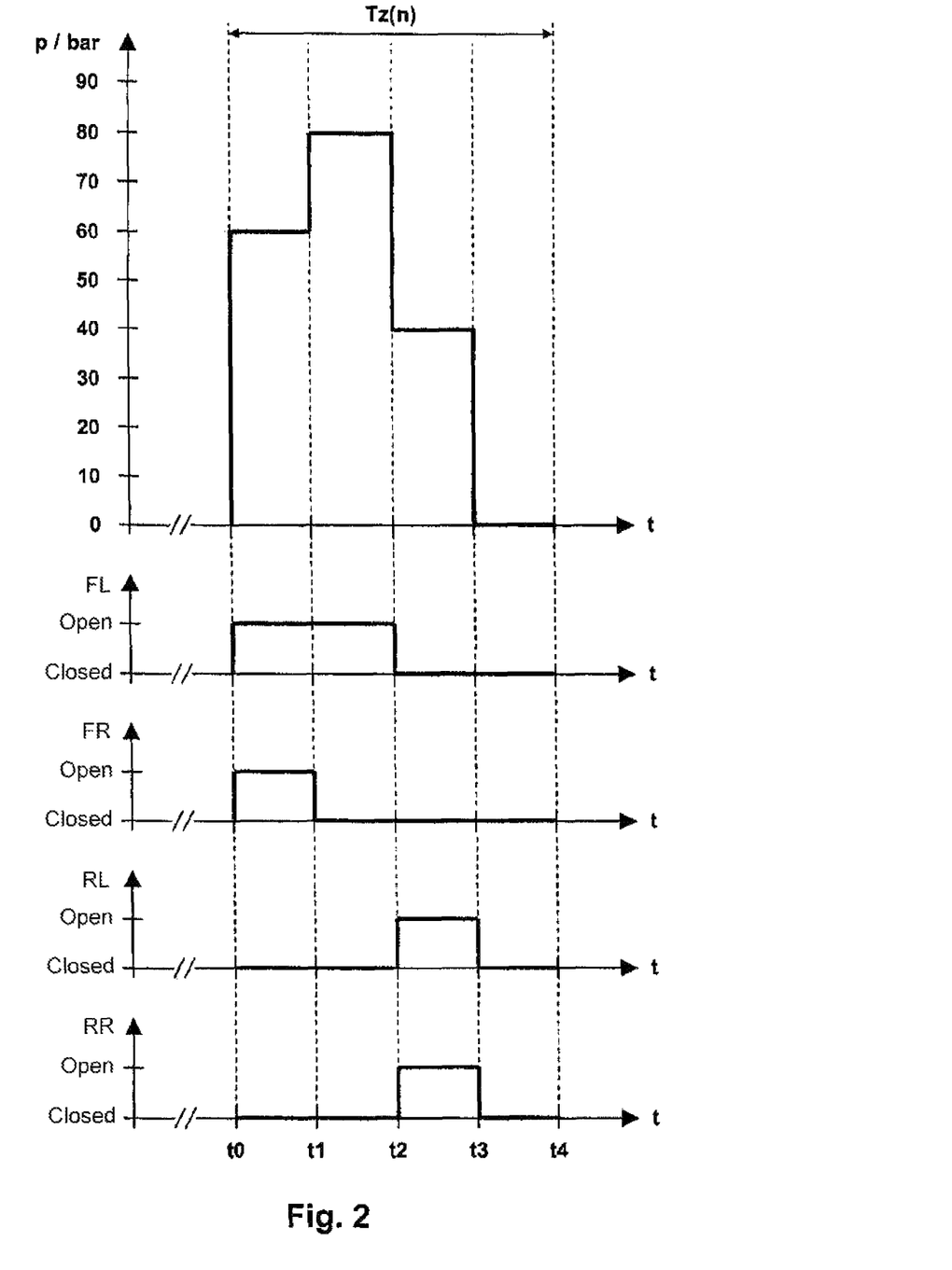
FIG. 2 shows a first embodiment, in respect of a build-up of brake pressure, according to the method according to the invention.
Figure 3:
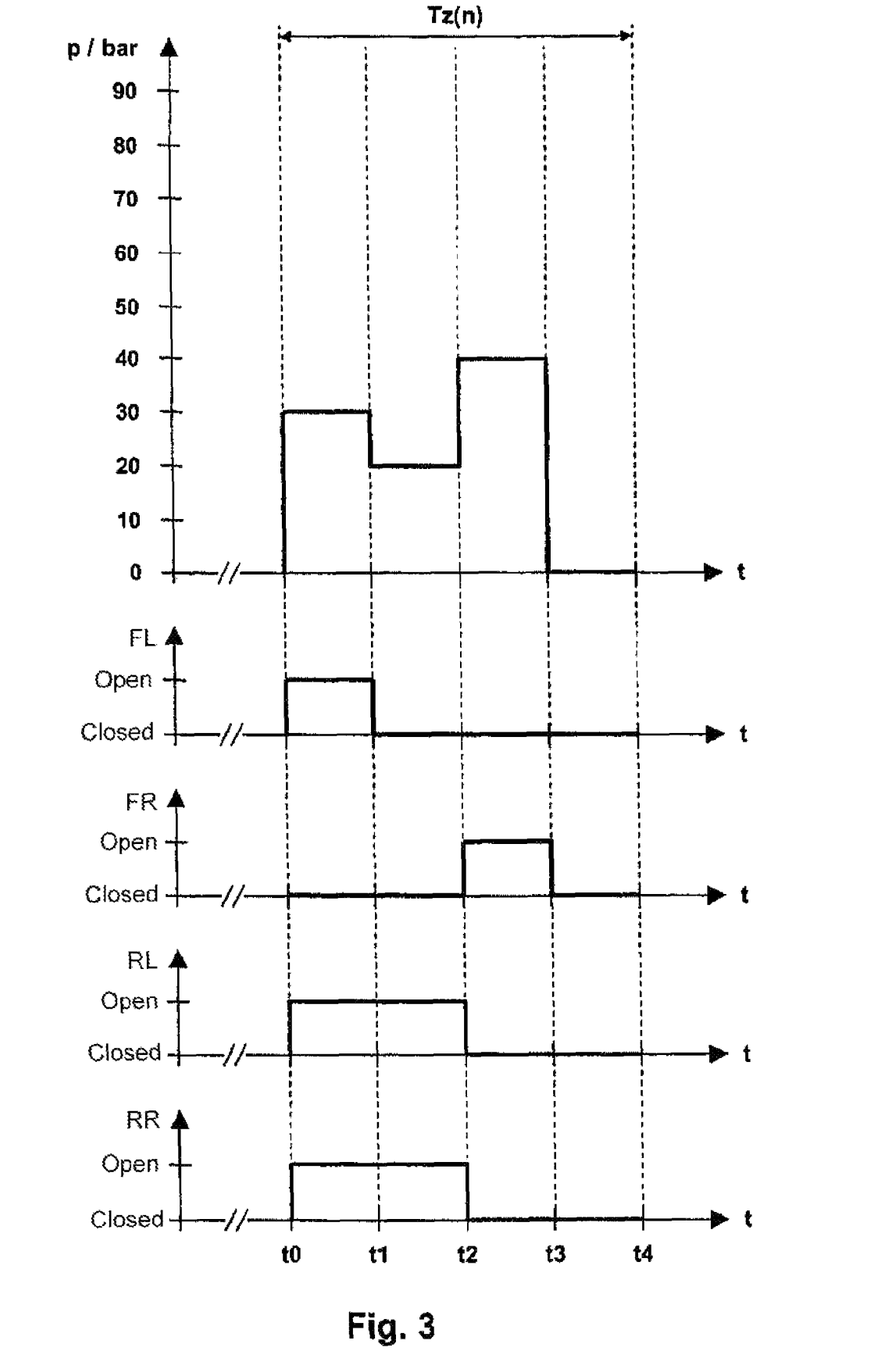
FIG. 3 shows a second embodiment, in respect of a reduction of brake pressure, according to the method according to the invention.
Figure 4:
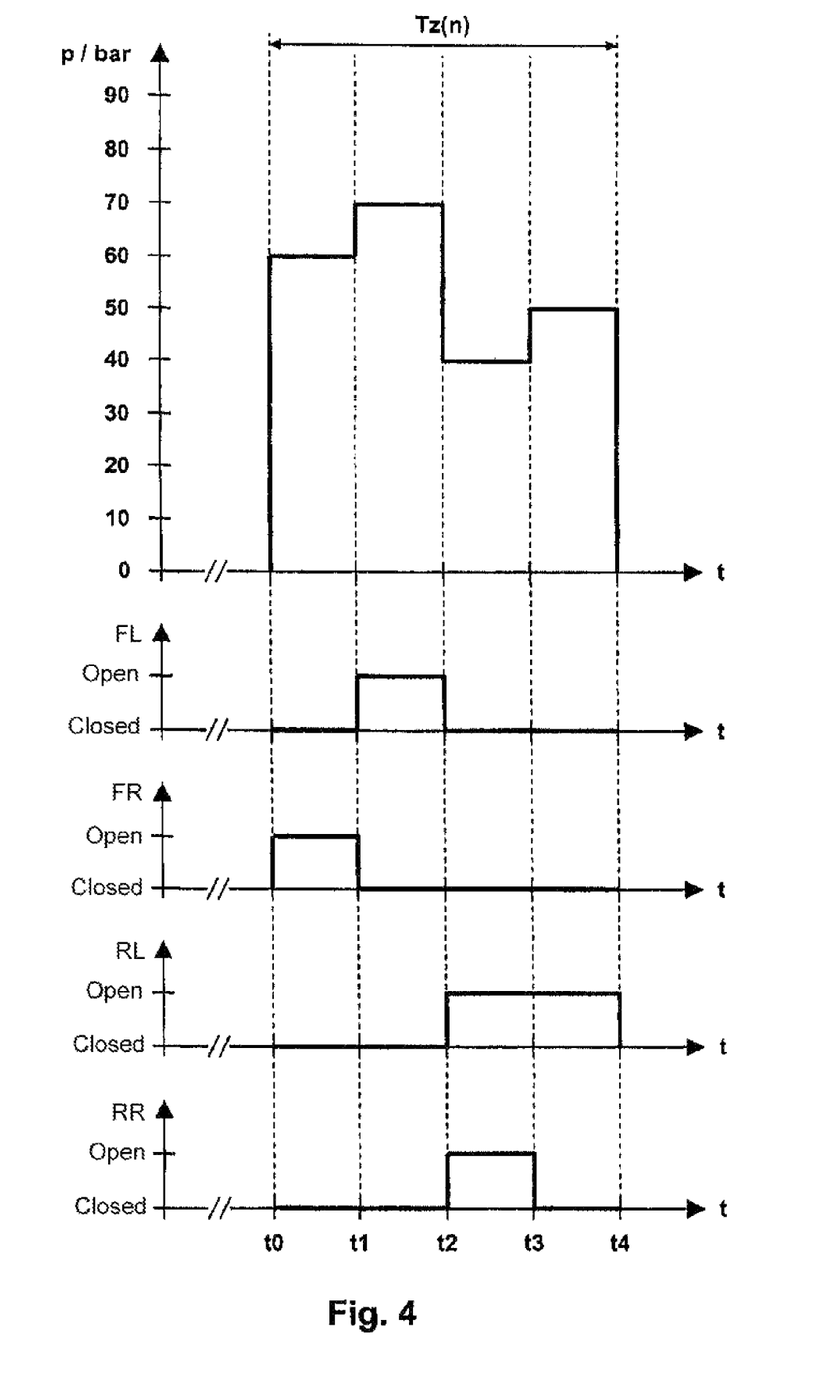
FIG. 4 shows a third embodiment, in respect of a build-up of brake pressure and a reduction of brake pressure within a multiplex cycle, according to the method according to the invention, wherein identical parts have been provided in each instance with the same reference symbols.

The adjusting of individual brake pressures in the individual wheel brakes FL, FR, RL, RR—such as is required, inter alia, for an anti-lock braking system (ABS), a traction control system (TCS), an electronic stability program (ESP) and the like—is effected in multiplex mode, which will be considered in connection with the embodiments of the method according to the invention represented in FIGS. 2 to 4.

In the case of multiplex operation the adjusting of the individual wheel-brake pressures occurs within multiplex cycles Tz which follow one another with a cycle-time of the order of magnitude of 10 ms: (in words: ten milliseconds). In this connection a current multiplex cycle Tz(n) as represented in FIGS. 2 to 4 has been subdivided into time-intervals (of equal duration) corresponding to the number of wheel brakes to be actuated, in which the brake pressures demanded for the wheel brakes are adjusted centrally in succession by the brake-pressure generator 10 and are maintained up until the following multiplex cycle Tz(n+1) by means of the valve arrangement assigned to the wheel brake. Therefore in the case of four wheel brakes FL, FR, RL and RR to be actuated (at least) four time-intervals [t0, t1], [t1, t2], [t2, t3] and [t3, t4] result.

In FIGS. 2 to 4 in each instance five timing diagrams have been represented above one another for a current multiplex cycle Tz(n). In the top timing diagram the brake pressure p centrally adjusted at the brake-pressure generator 10 has been represented, and in the four timing diagrams arranged underneath it the actuation state—closed or open—of the valve arrangements 71, 72, 81 and 82 assigned to the wheel brakes FL, FR, RL and RR.

In the case of the first embodiment represented in FIG. 2 the following brake-pressure-demand profile for a current multiplex cycle Tz(n) will be assumed:

from a preceding multiplex cycle Tz(n−1), at wheel brake FL let a build-up of brake pressure from 0 bar to 80 bar be required, at wheel brake FR from 0 bar to 60 bar, and at wheel brakes RL and RR in each instance from 0 bar to 40 bar, whereby the build-up of brake pressure at wheel brake FR has priority X, as summarised in the following table.

|  | Wheel Brake | | | |
| --- | --- | --- | --- | --- |
|  | FL | FR | RL | RR |
| Brake Pressure Tz(n − 1) | 0 bar | 0 bar | 0 bar | 0 bar |
| Brake Pressure Tz(n) | 80 bar | 60 bar | 40 bar | 40 bar |
| Priority |  | X1 |  |  |

Since the build-up of brake pressure at wheel brake FR has priority X1, in the first time-interval [t0, t1] the brake-pressure generator 10 adjusts the brake pressure p of 60 bar demanded for wheel brake FR, and the valve arrangement 72 assigned to wheel brake FR is opened. Hence priority X1 has been complied with, so that the valve arrangement 72 assigned to wheel brake FR can be closed at the end of the first time-interval [t0, t1] and can remain closed for the remaining duration of the current multiplex cycle Tz(n) in order to maintain the adjusted brake pressure of 60 bar for the remaining duration of the current multiplex cycle Tz(n).

Since for wheel brake FL a brake pressure greater (by 20 bar) than for wheel brake FR has been demanded and the brake pressure of 0 bar held over from the preceding multiplex cycle Tz(n−1) at wheel brake FL is less (by 60 bar) than the brake pressure demanded for wheel brake FR, in the first time-interval [t0, t1] valve arrangement 71 assigned to wheel brake FL is also opened. Hence a build-up of brake pressure to 60 bar at wheel brake FL is achieved already in the first time-interval [t0, t1].

Since for wheel brakes RL and RR in each instance a brake pressure lower (by 20 bar) than for wheel brake FR has been demanded, valve arrangements 81 and 82 respectively assigned to wheel brakes RL and RR are or remain closed in the first time-interval [t0, t1], so that the brake pressures thereof in each instance still amount to 0 bar from the preceding multiplex cycle Tz(n−1).

In the second time-interval [t1, t2] the brake-pressure generator 10 increases the brake pressure p from 60 bar (by 20 bar) to the brake pressure p of 80 bar demanded for wheel brake FL, and valve arrangement 71 assigned to wheel brake FL is opened or remains open. At the end of the second time-interval [t1, t2], valve arrangement 71 assigned to wheel brake FL is closed and remains closed for the remaining duration of the current multiplex cycle Tz(n) in order to maintain the adjusted brake pressure of 80 bar for the remaining duration of the current multiplex cycle Tz(n).

In the second time-interval [t1, t2], valve arrangements and 81 and 82 respectively assigned to wheel brakes RL and RR are or remain closed, so that the brake pressures thereof are in each instance maintained at 0 bar.

In the third time-interval [t2, t3] the brake-pressure generator 10 reduces the brake pressure p from 80 bar (by 40 bar) to the brake pressure p of 40 bar demanded in each instance for wheel brakes RL and RR, and valve arrangements 81 and 82 respectively assigned to wheel brakes RL and RR are opened. At the end of the third time-interval [t2, t3], valve arrangements 81 and 82 respectively assigned to wheel brakes RL and RR are closed and remain closed for the remaining duration of the current multiplex cycle Tz(n) in order to maintain the adjusted brake pressure of 40 bar for the remaining duration of the current multiplex cycle Tz(n).

Already at the end of the third time-interval [t2, t3] all the valve arrangements 71, 72, 81 and 82 respectively assigned to wheel brakes FL, FR, RL and RR have been closed and the brake-pressure-demand profile has been implemented, so that in the fourth time-interval [t3, t4] no adjustments are required. Since all the valve arrangements 71, 71, 81 and 82 have been closed, there is the possibility to reduce the brake pressure p (of 40 bar) last adjusted by the brake-pressure generator 10 completely to 0 bar.

In the case of the second embodiment represented in FIG. 3 the following brake-pressure-demand profile for the current multiplex cycle Tz(n) will be assumed:

Starting from the embodiment represented in FIG. 2 by way of preceding multiplex cycle Tz(n−1), at wheel brake FL let a reduction of brake pressure from 80 bar to 50 bar be required, at wheel brake FR from 60 bar to 30 bar, and at wheel brakes RL and RR in each instance from 40 bar to 20 bar, whereby the reduction of brake pressure at wheel brake FL has priority X, as summarised in the following table.

|  | Wheel Brake | | | |
| --- | --- | --- | --- | --- |
|  | FL | FR | RL | RR |
| Brake Pressure Tz(n − 1) | 80 bar | 60 bar | 40 bar | 40 bar |
| Brake Pressure Tz(n) | 30 bar | 40 bar | 20 bar | 20 bar |
| Priority | X1 | | | |

Since the reduction of brake pressure at wheel brake FL has priority X1, in the first time-interval [t0, t1] the brake-pressure generator 10 adjusts the brake pressure p of 30 bar demanded for wheel brake FL, and valve arrangement 71 assigned to wheel brake FL is opened. Hence priority X1 has been complied with, so that valve arrangement 71 assigned to wheel brake FL can be closed at the end of the first time-interval [t0, t1] and can remain closed for the remaining duration of the current multiplex cycle Tz(n) in order to maintain the adjusted brake pressure of 30 bar for the remaining duration of the current multiplex cycle Tz(n).

Since for wheel brakes RL and RR in each instance a brake pressure p lower (by 20 bar) than for wheel brake FL has been demanded and the brake pressure of 40 bar at wheel brakes RL and RR held over in each instance from the preceding multiplex cycle Tz(n−1) is greater (by 10 bar) than the brake pressure demanded for wheel brake FL, valve arrangements 81 and 82 assigned to wheel brakes RL and RR are also opened in the first time-interval [t0, t1]. Hence already in the first time-interval [t0, t1] in each instance a reduction of brake pressure to 30 bar is achieved at wheel brakes RL and RR.

Since for wheel brake FR a brake pressure greater (by 10 bar) than for wheel brake FL has been demanded, in the first time-interval [t0, t1] valve arrangement 72 assigned to wheel brake FR is or remains closed, so that the brake pressure thereof still amounts to 60 bar from the preceding multiplex cycle Tz(n−1).

In the second time-interval [t1, t2] the brake-pressure generator 10 reduces the brake pressure p from 30 bar (by 10 bar) to the brake pressure p of 20 bar demanded in each instance for wheel brakes RL and RR, and valve arrangements 81 and 82 assigned to wheel brakes RL and RR are opened or remain open. At the end of the second time-interval [t1, t2], valve arrangements 81 and 82 assigned to wheel brakes RL and RR are closed and remain closed for the remaining duration of the current multiplex cycle Tz(n) in order to maintain the adjusted brake pressure of 20 bar for the remaining duration of the current multiplex cycle Tz(n).

In the second time-interval [t1, t2], valve arrangement 72 assigned to wheel brake FR is or remains closed, so that the brake pressure thereof is maintained at 60 bar.

In the third time-interval [t2, t3] the brake-pressure generator 10 increases the brake pressure p from 20 bar (by 20 bar) to the brake pressure p of 40 bar demanded for wheel brake FR, and valve arrangement 72 assigned to wheel brake FR is opened. At the end of the third time-interval [t2, t3], valve arrangement 72 assigned to wheel brake FR is closed and remains closed for the remaining duration of the current multiplex cycle Tz(n) in order to maintain the adjusted brake pressure of 40 bar for the remaining duration of the current multiplex cycle Tz(n).

Here too, already at the end of the third time-interval [t2, t3] all the valve arrangements 71, 72, 81 and 82 respectively assigned to wheel brakes FL, FR, RL and RR have been closed, and the brake-pressure-demand profile has been implemented.

In the case of the third embodiment represented in FIG. 4 the following brake-pressure-demand profile for a current multiplex cycle Tz(n) will be assumed:

Starting from a preceding multiplex cycle Tz(n−1), at wheel brake FL let a reduction of brake pressure from 80 bar to 70 bar be required, at wheel brake FR a reduction of brake pressure from 80 bar to 60 bar, at wheel brake RL a build-up of brake pressure from 20 bar to 50 bar, and at wheel brake RR a build-up of brake pressure from 20 bar to 40 bar, whereby the reduction of brake pressure at wheel brake FR has first (highest) priority X1, the reduction of brake pressure at wheel brake FL has second priority X2, the build-up of brake pressure at wheel brake RR has third priority X3, and the build-up of brake pressure at wheel brake RL has fourth (lowest) priority X4, as summarised in the following table.

|  | Wheel Brake | | | |
| --- | --- | --- | --- | --- |
|  | FL | FR | RL | RR |
| Brake Pressure Tz(n − 1) | 80 bar | 80 bar | 20 bar | 20 bar |
| Brake Pressure Tz(n) | 70 bar | 60 bar | 50 bar | 40 bar |
| Priority | X2 | X1 | X4 | X3 |

Since the reduction of brake pressure at wheel brake FR has first priority X1, in the first time-interval [t0, t1] the brake-pressure generator 10 adjusts the brake pressure p of 60 bar demanded for wheel brake FR, and valve arrangement 72 assigned to wheel brake FR is opened. Hence the first priority X1 has been complied with, so that valve arrangement 72 assigned to wheel brake FR can be closed at the end of the first time-interval [t0, t1] and can remain closed for the remaining duration of the current multiplex cycle Tz(n) in order to maintain the adjusted brake pressure of 60 bar for the remaining duration of the current multiplex cycle Tz(n).

Since for wheel brake FL a brake pressure greater (by 10 bar) than for wheel brake FR has been demanded, but the brake pressure of 80 bar at wheel brake FL held over from the preceding multiplex cycle Tz(n−1) is greater (by 20 bar) than the brake pressure demanded for wheel brake FR, in the first time-interval [t0, t1] valve arrangement 71 assigned to wheel brake FL is or remains closed.

In order to comply with the second priority X2, in the second time-interval [t1, t2] the brake-pressure generator 10 increases the brake pressure p from 60 bar (by 10 bar) to the brake pressure p of 70 bar demanded for wheel brake FL, and valve arrangement 71 assigned to wheel brake FL is opened. At the end of the second time-interval [t1, t2], valve arrangement 71 assigned to wheel brake FL is closed and remains closed for the remaining duration of the current multiplex cycle Tz(n) in order to maintain the adjusted brake pressure of 70 bar for the remaining duration of the current multiplex cycle Tz(n).

In the first time-interval [t0, t1] and in the second time-interval [t1, t2], valve arrangements 81 and 82 respectively assigned to wheel brakes RL and RR are or remain closed, so that the brake pressures thereof are in each instance maintained at 20 bar.

Since the build-up of brake pressure at wheel brake RR has third priority X3, in the third time-interval [t2, t3] the brake-pressure generator 10 reduces the brake pressure p from 70 bar (by 30 bar) to the brake pressure p of 40 bar demanded for wheel brake RR, and valve arrangement 82 assigned to wheel brake RR is opened. Hence the third priority X3 has been complied with, so that valve arrangement 82 assigned to wheel brake RR can be closed at the end of the third time-interval [t2, t3] and can remain closed for the remaining duration of the current multiplex cycle Tz(n) in order to maintain the adjusted brake pressure of 40 bar for the remaining duration of the current multiplex cycle Tz(n).

Since for wheel brake RL a brake pressure greater (by 10 bar) than for wheel brake RR has been demanded, and the brake pressure of 20 bar at wheel brake RL held over from the preceding multiplex cycle Tz(n−1) is less (by 20 bar) than the brake pressure demanded for wheel brake RR, in the third time-interval [t2, t3] valve arrangement 81 assigned to wheel brake RL is also opened. Hence already in the third time-interval [t2, t3] a build-up of brake pressure to 40 bar is achieved at wheel brake RL.

In the fourth time-interval [t3, t4] the brake-pressure generator 10 increases the brake pressure p from 40 bar (by 10 bar) to the brake pressure p of 50 bar demanded for wheel brake RL with fourth priority X4, and valve arrangement 81 assigned to wheel brake RL is opened or remains open. At the end of the fourth time-interval [t3, t4], valve arrangement 81 assigned to wheel brake RL is closed, by which the implementation of the brake-pressure-demand profile has been concluded.

In conclusion, let it also be mentioned that practice-oriented embodiments of the invention are elucidated in exemplary manner with reference to FIGS. 1 to 4, for which reason it is within the discretion of a person skilled in the art to undertake modifications and combinations within the scope of the claims and the description, particularly with respect to the allocation and transfer of priority.

The invention claimed is:

1. A method for operating an electronically controllable braking system for a motor vehicle that includes a hydraulic brake-pressure generator that generates the brake pressures for wheel brakes of the vehicle, wherein in the hydraulic connection to the brake-pressure generator, a valve arrangement has been assigned to each wheel brake in order to adjust the brake pressures demanded for the wheel brakes in multiplex mode, the method comprising the steps of:
   (a) establishing for which of the wheel brakes the adjusting of the brake pressure demanded for it in a current multiplex cycle has priority;
   (b) generating the brake pressure demanded for the wheel brake that has been set to priority;
   (c) opening the valve arrangement that has been assigned to the wheel brake that has been set to priority; and
   (d) closing the valve arrangements that have been assigned to the wheel brakes that have not been set to priority.

2. The method defined in claim 1, characterized by the step of opening the valve arrangement that has been assigned to a wheel brake that has not been set to priority if the brake pressure demanded for the assigned wheel brake is greater than the generated brake pressure.

3. The method defined in claim 2, characterized by the step of opening the valve arrangement that has been assigned to a wheel brake that has not been set to priority if the brake pressure at the assigned wheel brake held over from the preceding multiplex cycle is less than the generated brake pressure.

4. The method defined in claim 1, characterized by the step of opening the valve arrangement that has been assigned to a wheel brake that has not been set to priority if the brake pressure demanded for the assigned wheel brake is less than the generated brake pressure.

5. The method defined in claim 4, characterized by the step of opening the valve arrangement that has been assigned to a wheel brake that has not been set to priority if the brake pressure at the assigned wheel brake held over from the preceding multiplex cycle is greater than the generated brake pressure.

6. The method defined in claim 1, characterized by the step of transferring the priority for the adjusting of the demanded brake pressure in the current multiplex cycle to a wheel brake that has not yet been set to priority in the current multiplex cycle.

7. The method defined in claim 1, characterized by the step of closing the valve arrangement if the demanded brake pressure in the assigned wheel brake has been attained.

8. The method defined in claim 7, characterized by the step of keeping the valve arrangement closed until the end of the current multiplex cycle.

9. An electronically controllable braking system for a motor vehicle including a hydraulic brake-pressure generator which generates the brake pressures demanded for the wheel brakes of the vehicle, wherein in the hydraulic connection to the brake-pressure generator a valve arrangement has been assigned to each wheel brake, characterized in that for the electric drive of the brake-pressure generator and of the valve arrangements an electronic control unit has been provided, by means of which the braking system is operated according to a method comprising the steps of:
   (a) establishing for which of the wheel brakes the adjusting of the brake pressure demanded for it in a current multiplex cycle has priority;
   (b) generating the brake pressure demanded for the wheel brake that has been set to priority;

(c) opening the valve arrangement that has been assigned to the wheel brake that has been set to priority; and (d) closing the valve arrangements that have been assigned to the wheel brakes that have not been set to priority.

10. The braking system defined in claim 9, characterized in that the brake pressure generated by the brake-pressure generator is registered by means of a sensor device and in the electronic control unit is compared with the brake pressures demanded for the wheel brakes in order to regulate or control the brake pressure generated by the brake-pressure generator.

* * * * *